Oct. 25, 1955  J. D. BAKER  2,721,592
CIRCLE CUTTING BIT
Filed June 1, 1951
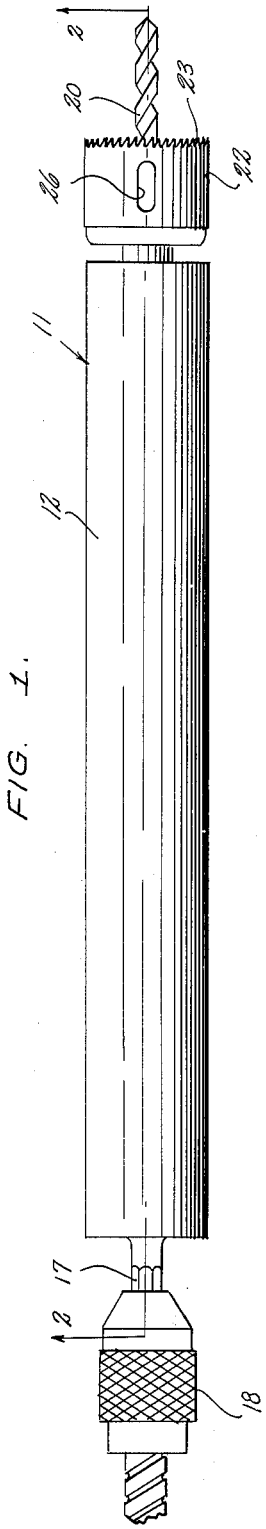
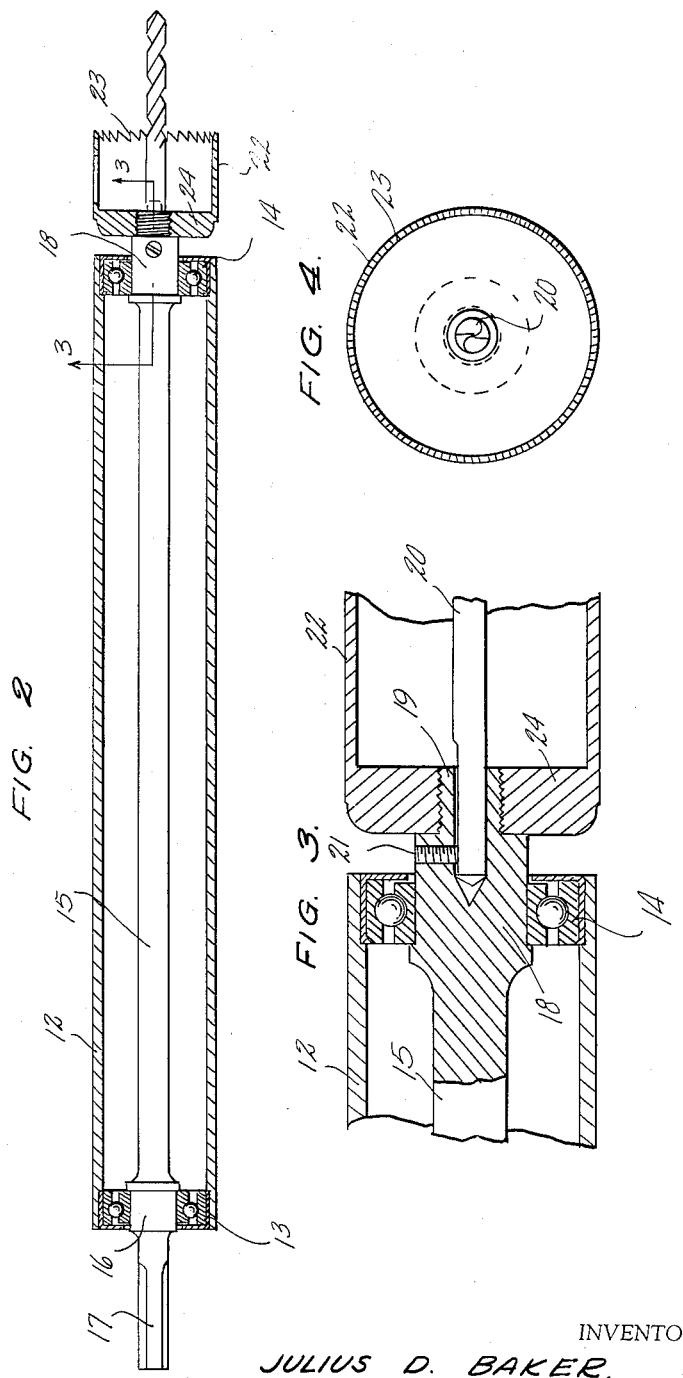
INVENTOR
JULIUS D. BAKER,
BY
McMorrow, Berman + Davidson
ATTORNEYS

United States Patent Office 2,721,592
Patented Oct. 25, 1955

2,721,592

CIRCLE CUTTING BIT

Julius D. Baker, St. Petersburg, Fla.

Application June 1, 1951, Serial No. 229,489

1 Claim. (Cl. 145—116)

This invention relates to drill bits, and more particularly to a circle cutting bit adapted to be employed in cutting through relatively thick structures in a direct line to a desired point, the tool being of special use to electricians and other artisans in installing house-wiring and in similar operations.

A main object of the invention is to provide a novel and improved rotary cutting tool adapted to be employed as a drill bit for cutting holes through roofs or cornices of buildings and through similar structures to form a passage extending in a direct line to a desired point, for example, to form a passage for the reception of electrical conduit or cable in the process of wiring a building.

A further object of the invention is to provide an improved circle cutting bit for cutting a passage in a direct line to a desired point, said bit being simple in construction, being easy to use, providing an efficient cutting action, and providing a great saving in time in cutting a hole through a roof, cornice, or similar structure directed toward a desired point.

Further objects and advantages of the invention will become apparent from the following description and claim, and from the accompanying drawings wherein:

Figure 1 is a side elevational view of an improved circle cutting bit constructed in accordance with the present invention, shown attached to the chuck of a drill;

Figure 2 is a longitudinal cross-sectional view taken on the line 2—2 of Figure 1;

Figure 3 is an enlarged cross-sectional detail view taken on the line 3—3 of Figure 2;

Figure 4 is an enlarged end elevational view of the circle cutting bit of Figure 1.

Referring to the drawings, the improved circle cutting bit is designated generally at 11, and comprises an elongated, cylindrical sleeve 12 provided at its ends with respective ball bearing units 13 and 14. Journaled in said ball bearing units and extending axially through the sleeve 12 is an elongated shaft 15 formed at one end with the enlarged bearing portion 16 which is received in the ball bearing unit 13 and with the noncircular shank portion 17 adapted to be secured in a conventional chuck 18, as shown in Figure 1, such as the chuck of a hand electric drill. The other end of shaft 15 is formed with the enlarged bearing portion 18 which is rotatably received in the ball bearing unit 14, the enlarged portion 18 terminating in a reduced, threaded stud element 19. Stud element 19 is hollow, and is adapted to receive the noncircular end of a twist drill 20 in the manner shown in Figure 3, the enlarged portion 18 being provided with a set screw 21 adapted to lockingly engage the noncircular end portion of the twist drill 20.

Designated at 22 is a tubular saw blade having the circular toothed periphery 23 and the thickened rear wall 24. Rear wall 24 is formed with a central threaded aperture which is threadedly engaged on the stud 19, as shown in Figure 3. The tubular saw blade 22 is formed with a longitudinal slot 26 providing clearance for the escape of air from the interior of the tubular saw blade as the disc which it cuts is moved inwardly into the tubular blade.

In operation, the twist drill bit 20 is first employed to form a pilot hole at the location where the passage is desired, and after said hole has been formed, the bit may be advanced to engage the toothed periphery 23 of the tubular saw blade 22 with the surface of the material to be cut, whereby said tubular saw blade cuts an enlarged circular opening through the material. The diameters of the sleeve member 12 and the tubular saw blade 22 are substantially equal, the outside diameter of the tubular saw blade 22 being preferably slightly larger than the outside diameter of the sleeve 12, whereby said sleeve may enter the opening formed by the tubular saw blade and provided a bearing for the shaft 15 as the bit is advanced through the opening. It will be understood that the bit is withdrawn from the opening, as required, to remove the circular disc from the tubular saw blade 22 as each thickness of material is penetrated. It will be apparent that in cutting through various thicknesses of material which are spaced apart, the sleeve member 12 defines a tubular guide or bearing for the shaft 15, enabling said shaft to be held in proper alignment so that the successive holes cut by the tubular saw 22 are accurately aligned along the same axis. The sleeve member 12 is of substantial length, sufficient to pass through a roof or other structure of considerable thickness.

While a specific embodiment of an improved circle cutting bit has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A circle cutting bit of the character described comprising an elongated cylindrical sleeve member of uniform diameter, respective ball bearings fixedly mounted in the ends of said sleeve member concentric therewith, an elongated shaft journaled in said ball bearings and extending axially in said sleeve member, one end of said shaft projecting from one end of said sleeve member and being arranged to be grippingly engaged in the chuck of a drill, the other end of said shaft projecting from the other end of said sleeve member and being formed with a reduced externally threaded hollow stud element, a tubular saw blade threadedly secured on said stud element, and a drill bit axially secured in said stud element and projecting from the tubular saw blade, said sleeve member and tubular saw blade being substantially equal in outside diameter, whereby said tubular saw blade is adapted to cut a bore through which the sleeve member is slidable.

References Cited in the file of this patent

UNITED STATES PATENTS

| 1,855,873 | Shortell | Apr. 26, 1932 |
| 1,885,022 | Santiago | Dec. 6, 1932 |
| 1,903,781 | Eisele | Apr. 18, 1933 |
| 2,072,320 | Thomas | Mar. 2, 1937 |
| 2,076,039 | Miller | Apr. 6, 1937 |
| 2,473,077 | Starbuck | June 14, 1949 |